United States Patent
Pintsov

(10) Patent No.: US 10,607,115 B1
(45) Date of Patent: *Mar. 31, 2020

(54) AUTOMATIC GENERATION OF TRAINING DATA FOR COMMERCIAL DOCUMENT IMAGE CLASSIFICATION

(71) Applicant: David Pintsov, San Diego, CA (US)

(72) Inventor: David Pintsov, San Diego, CA (US)

(73) Assignee: Ancora Software, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/655,781

(22) Filed: Oct. 17, 2019

Related U.S. Application Data

(60) Provisional application No. 62/792,152, filed on Jan. 14, 2019.

(51) Int. Cl.
*G06K 9/62* (2006.01)
*G06K 9/00* (2006.01)

(52) U.S. Cl.
CPC ....... *G06K 9/6257* (2013.01); *G06K 9/00463* (2013.01); *G06K 9/00483* (2013.01); *G06K 9/623* (2013.01)

(58) Field of Classification Search
CPC ............. G06K 9/6257; G06K 9/00483; G06K 9/00463; G06K 9/623
See application file for complete search history.

(56) References Cited

U.S. PATENT DOCUMENTS

| | | | |
|---|---|---|---|
| 8,595,235 B1* | 11/2013 | Sampson | G06K 9/00483 707/737 |
| 8,724,907 B1* | 5/2014 | Sampson | G06K 9/6255 382/209 |
| 8,832,108 B1* | 9/2014 | Sampson | G06K 9/00463 707/737 |
| 9,396,540 B1* | 7/2016 | Sampson | G06K 9/00463 |
| 2013/0236111 A1* | 9/2013 | Pintsov | G06K 9/00483 382/224 |

* cited by examiner

*Primary Examiner* — Amara Abdi

(57) ABSTRACT

An automated method for generation of training samples for classification of electronic images of commercial documents such as invoices, bills of lading, explanations of benefits, etc. is described. An image of a page of a document is generated as a representative of similar pages from the same origin regardless whether the page of the document contains permanent and variable information or just permanent information.

2 Claims, 4 Drawing Sheets

GeoDist (w1,w2) = |x1 − x3| + |y1 − y3| + |x2 −x4| + |y2 − y4|

ABC Inc,
999 Main Street South
Springfield, IL 62701

XYZ Ltd,
543 Mountain Road
San Diego, CA 92335

101

Invoice Number A2312007

[Invoice]

102

Invoice Date 08.07.2011

| Qty Ordered | Qty shipped | Product Code | Unit Price | Extended Price |
|---|---|---|---|---|
| 1 | 1 | 1256 | 2.43 | 2.43 |
| 2 | 2 | 3248 | 11.99 | 23.98 |

Total     26.41

*FIG. 1*

Automatic Generation of
Training Data
For Commercial Document
Image Classification GeoDist (w1,w2) = |x1 − x3| + |y1 − y3| + |x2 −x4| + |y2 − y4|

LineDist(L, M) depends on (Pos(L) - Pos(M)) and (Length(L) - Length(M))

AUTOMATIC GENERATION OF TRAINING DATA FOR COMMERCIAL DOCUMENT IMAGE CLASSIFICATION

FIELD OF INVENTION

The present invention describes a method and system for an automatic generation of training images for classification of a plurality of electronic documents (e.g. in TIFF, PDF or JPG formats) of into classes of similarly laid out documents that originate from the same source such as accounting systems, enterprise resource management software, accounts receivable management software, etc.

BACKGROUND OF THE INVENTION AND RELATED ART

The number of documents that are exchanged between different businesses is increasing very rapidly. Every institution, be it a commercial company, an educational establishment or a government organization receives hundreds and thousands of documents from other organizations every day. All these documents have to be processed as fast as possible and information contained in them is vital for various functions of both receiving and sending organizations. It is, therefore, highly desirable to automate the processing of received documents.

There are many document classification systems known in the art. The references described below and the art cited in those references is incorporated in the background below. There are at least two ways of interpreting the term "classification". One relates to classifying documents into groups having similar context. Normally it means documents having similar collections of related keywords. This is sometimes called categorization. Another way of classifying documents treats documents as similar if they have similar layouts. It is this latter classification that the present invention is concerned with.

In U.S. Pat. No. 8,831,361 B2 was described a system for commercial document image classification. However, optimal selection of training images was not addressed in this patent. The problem of optimal selection of training images arises also in such commercial forms as Fannie Mae 1003 Uniform Residential Loan Application where permanent information (layout elements) on the form is mixed with variable information that changes within the documents of the same type that must be classified as belonging to the same class of documents. If variable elements of the layout are participating in the classification process they can considerably impair the results of classification. Therefore, it is desirable to use only permanent elements of the layout for classification purposes and ignore the variable ones. The present invention discloses a method of using only permanent information of the documents for these purposes. U.S. Pat. No. 8,831,361 B2 is incorporated herein as a reference.

The present invention discloses a totally automatic method of generating training images for classifying documents which originate from a specific printing program (such as an invoice printing software or a form such as Fannie Mae 1003). These documents typically exhibit a specific pre-programmed layout. The layout in this context means a specific geometric configuration of isolated text blocks and their interrelations, geometric lines and their interrelations, the contents of text blocks or keywords such as legends pre-printed on forms (e.g. name of borrower, social security number, etc.).

SUMMARY OF THE INVENTION

The present invention provides a method and system for automatically generating electronic images of documents (having a specific fixed originating mechanism such as computer printing program) containing largely permanent rather than variable elements of the documents' layout, such permanent elements being legends, pre-printed geometric lines and originator's addresses, telephone numbers, etc. The method relies on utilization of permanent layout features while variable content of the documents is ignored.

One embodiment of the present invention allows generating training images when the samples of documents to be classified are pre-sorted in directories/folders containing documents of the same origination. Another embodiment is designed to handle a more complex case when the images documents/pages are not pre-sorted and available only in a random selection.

BRIEF DESCRIPTION OF THE DRAWINGS

FIG. 1 is an illustrative representation of a typical class of documents that are subject of the present invention.

DETAILED DESCRIPTION OF THE PREFERRED EMBODIMENT

For the purposes of this disclosure and in variance with U.S. Pat. No. 8,831,361 B2, layout of a document page is understood here as a couple (W, L) where W is a set of all the words present in the page which includes the bounding rectangles of words with their coordinates and the text strings forming the words, L is a set of pre-printed geometric lines in the document both vertical and horizontal. FIG. 1, depicts a typical business document, where element 101 shows a word and 102 is a geometric pre-printed line. The present invention aims at generating images of document pages such images may contain only permanent layout elements that are largely invariant between images of documents from the same source, thus containing only the same words in approximately the same locations and geometric lines appearing in approximately the same locations on the images. For example, Fannie Mae 1003 form printed in the same year by the same company would normally possess preprinted permanent legends such as the words "Borrower" and "Co-Borrower" and horizontal lines such as those framing the words "TYPE OF MOTGAGE and TERMS OF LOAN". On the other hand, the actual names and addresses on the documents would constitute variable elements. The documents originating from different organizations would normally have totally different layouts. Similarly, the patterns of pre-printed horizontal and vertical geometric lines L that are distinguished by their positions and lengths exhibit a degree of invariance provided that they originate with the same source. This does not mean that the lines would be identical since the documents having variable contents necessitate variability in the line patterns. Even invoices printed by the same software program may have a different number of line items, different number of columns and different number of lines.

As opposed to U.S. Pat. No. 8,831,361, the present invention is designed for generating the training images (for classification process) off-line, making the speed of the generation process unimportant, and the OCR data plays an essential role in this process.

Figure 2:
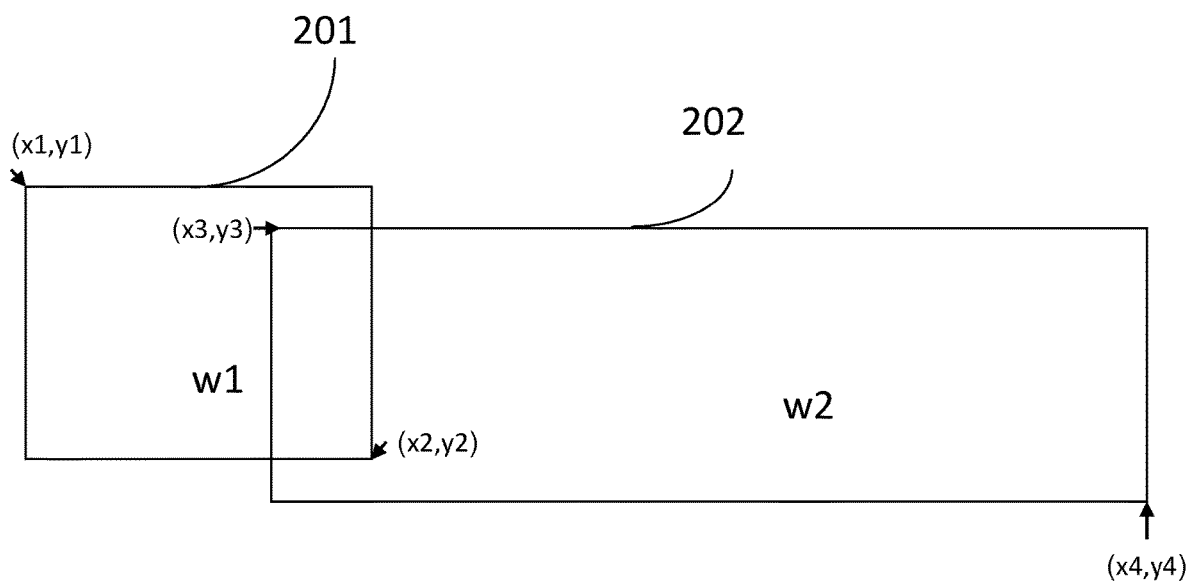
FIG. 2 depicts a geometric distance between two words, where (x1,y1), (x2,y2), (x3,y3) and (x4,y4) denote Cartesian coordinates of the corners of bounding triangles of two words w1 and w2
Figure 4:
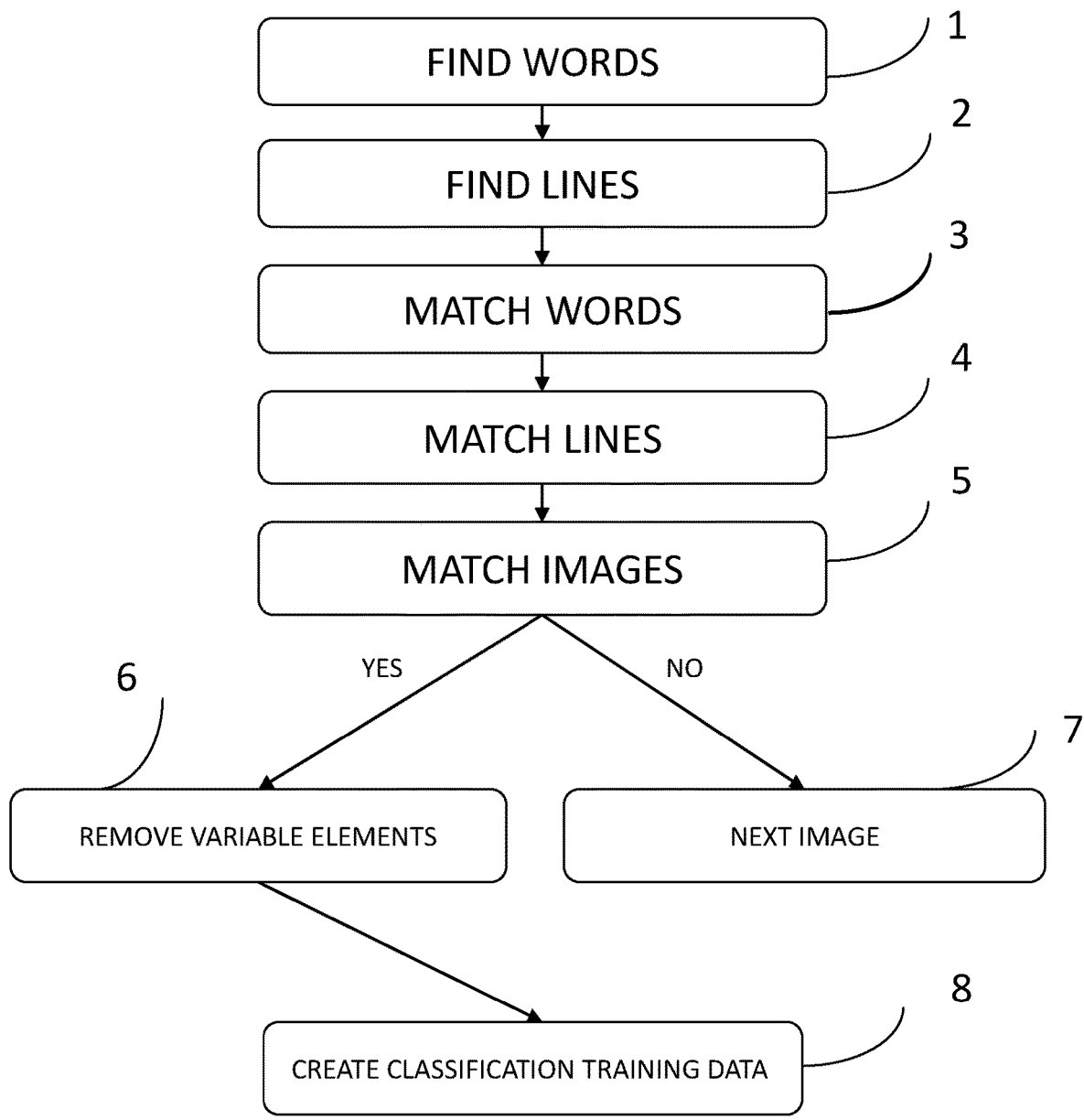
FIG. 4 shows the flowchart of the generation process for any two images.

The first step according to the preferred embodiment of the present invention is for any image of a page of the document to find all the words in that image with all their bounding rectangles and their OCR identities (FIG. 4, step 1). This is routinely done by any commercially available OCR software. The next step is to find all the geometric lines in the image where words have been found (FIG. 4. Step 2). If a set of training images pre-classified into classes of images from the same source is available then the next step is to choose an arbitrary image of the same class (that is the image originated from the same source) and subject this second image to the same process of finding all the words and all the lines in it. The next step prescribes matching the words found in two images. This can be done in several ways and those skilled in art can modify the method that is described in the present invention in any manner without detracting from the essence of the present invention. The proposed word distance between any two words in two images consists of two components: the string distance between the strings forming two words and the geometric distance between the bounding rectangles of the words, that distance is depicted in FIG. 2: if $(x_1, y_1)$ and $(x_2, y_2)$ are the Cartesian coordinates of the left upper corner and the right lower corner of word w1 and $(x_3, y_3)$ and $(x_4, y_4)$ are the corresponding coordinates of corners of word w2 then the geometric distance between these two words is defined as $$GeoDist(w1,w2)=|x1-x3|+|y1-y3|+|x2-x4|+|y2-y4|$$

This distance will be zero for words whose bounding rectangles are the same and it will grow larger and larger as the rectangles become far apart. There are several string distances known in the art. U.S. Pat. No. 8,831,361 describes string matching which is incorporated as a reference herein but for convenience it is reproduced here. The text string distance can be calculated by a standard Damerau-Levenshtein distance algorithm (Levenshtein V. I., "Binary codes capable of correcting deletions, insertions, and reversals". Soviet Physics Doklady 10: pp. 707-710, 1966), that calculates the distance between two text strings. Alternatively, the Fisher-Wagner dynamic programming algorithm as described in R. A. Wagner and M. J. Fisher, The string-to-string correction problem, Journal of the Association for Computing Machinery, 21(1):168-173, January 1974, can be used for approximate string matching. Both sources are incorporated as references herein. The final distance between two words is calculated as $$WordDistance(w1,w2)=v_1 GeoDist(w1,w2)+v_2 StringDist(w1,w2),$$

where $v_1$ and $v_2$ are appropriately chosen weight coefficients and StringDist is the just referred to Damerau-Levenshtein distance or any other distance between two strings that reflect their similarity. Once the distance between words is defined, a matrix of pair-wise distances WDist $(w_i, w_j)$ is obtained for all pairs of words (i,j) found in two images. The preferred embodiment for the present invention utilizes assignment algorithms that calculate the optimal assignment of words $w_i$, $w_j$ (matching in the sense of the shortest distance) based on the distance described above. Assignment algorithms are described in R. Burkard, M. Dell'Amico, S. Martello, Assignment Problems, SIAM, 2009, and incorporated by reference herein. If, as was assumed above, the two images are from the same source then the optimal assignment of words will result in closely matching pairs of words from two images as shown in FIG. 4, Step 3. At this stage one of the images (it is immaterial which one) is taken as a prototype of the training image and in this image only the closely matching words which constitute the permanent elements of the layout are retained. All other words are removed.

The following word distance between any two images $I_1$, $I_2$ can be calculated $$DW(I_1,I_2)=\Sigma WordDistance(U_i,V_j)$$

where summation is over all pairs of optimally matched words $U_i$, $V_j$, words $U_i$ coming from image $I_1$, words $V_j$ coming from image $I_2$.

Figure 3:
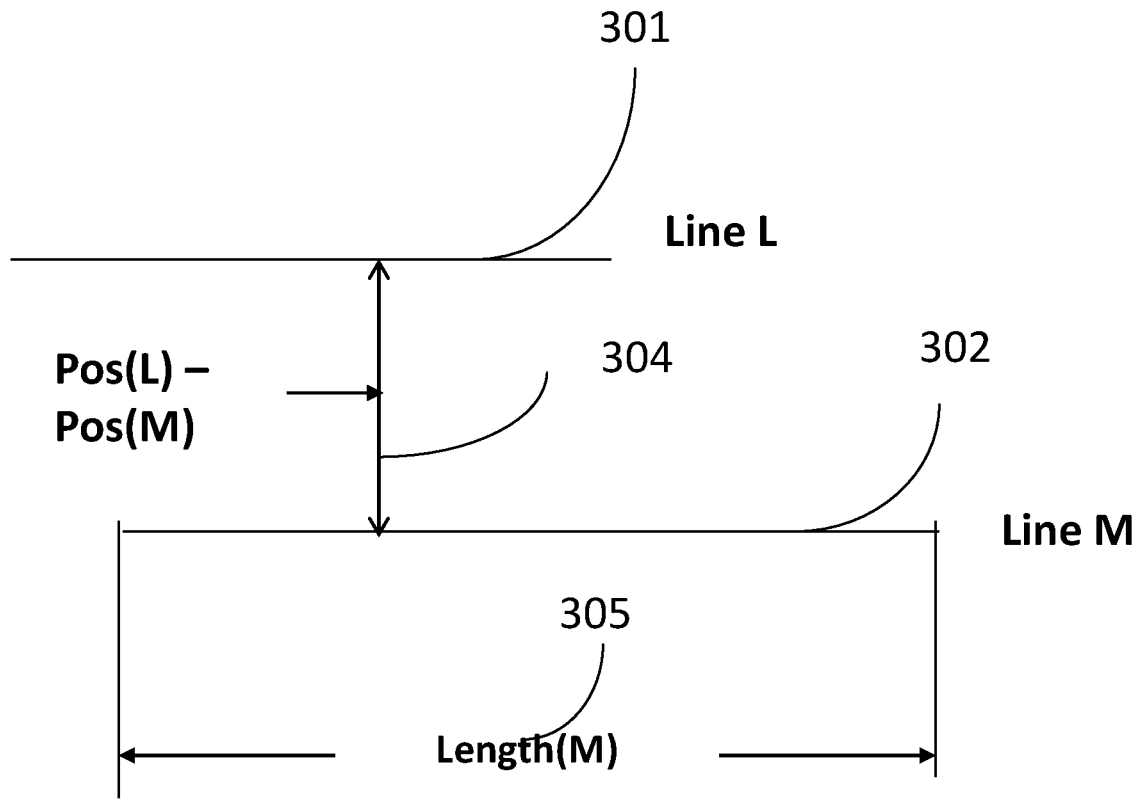
FIG. 3 depicts a content (string) distance between lines

The next step, according to the present invention, is to calculate the distance between the line patterns of two images. Similarly to U.S. Pat. No. 8,831,361, the line segment matching is done separately for the horizontal and for the vertical lines. Since the method is the same for both horizontal and vertical lines, notations that are used below apply to both directions of geometric lines. Each line segment is defined by its position (location) and length. If $P=(L_1, L_2, L_3, \ldots L_n)$ is a set of, say, horizontal line segments in the image I and $Q=(M_1, M_2, M_3, \ldots M_r)$ is a set of horizontal line segments in the image T the following pair-wise distances between any two line segments are calculated according to the present invention (0<i<n+1, 0<j<r+1) as $$LineDist_h(L_i,M_j)=w_p[Pos(L_i)-Pos(Mj)]/N_p+w_l[Length(L_i)-Length(Mj)]/N_l,$$

where Pos (L) designates the position of line segment L (ordinate for horizontal line segments and abscissa for vertical line segments), Length (L) is the length of line segment L, $N_p$, $N_l$ are suitable normalization factors (which could be the maximal width and height of the reference image and the input image) and $w_p$, $w_l$ are weights of both features, position and length respectively, $w_p$=0.5, $w_l$=0.5. This distance is illustrated in FIG. 3, where element 301 depicts line L, 302 shows line M, element 304 shows the difference between positions of lines L and M, element 305 shows the length of line M.

Having calculated the matrix of pair-wise distances LineDist$_h$ $(L_i, M_j)$, the optimal matching of line segments $L_i$ and $M_j$ is done via an assignment algorithm exactly in the same way as was described for the words, the only difference being the use of the line distance instead of the word distance.

Consistent with the preferred embodiment of the present invention, the next step is to compute the distance between two horizontal line patterns $P=(L_1, L_2, L_3, \ldots L_n)$ and $Q=(M_1, M_2, M_3, \ldots M_r)$ from images $I_1$ and $I_2$ as the sum of pair-wise distances $$D_h(I_1,I_2)=\Sigma LineDist_h(L_i,M_j),$$

where summation is carried over all pairs of optimally matched horizontal line segments $L_i$ and $M_j$. The distance $D_v$ between vertical line patterns of two images is calculated, mutatis mutandis, in the exact same manner as for the horizontal ones:

$$LineDist_v(L_i,M_j)=w_p[Pos(L_i)-Pos(Mj)]/N_p+w_l[Length(L_i)-Length(Mj)]/N_l,$$

where in this case $L_i$ and $M_j$ represent the vertical line segments, and the normalization factors are for the vertical line segments.

Again, the optimal matching of vertical line segments is carried out by an assignment algorithm and the distance between two vertical line patterns $P=(L_1, L_2, L_3, \ldots L_n)$ and $Q=(M_1, M_2, M_3, \ldots M_r)$ of two images $I_1$ and $I_2$ is defined as the sum of all pair-wise distances $$D_v(I_1,I_2)=\Sigma \text{LineDist}_v(L_i,M_j),$$

where summation is carried over all pairs of optimally matched vertical line segments $L_i$ and $M_j$.

The following line distance between two images comprising both horizontal and vertical lines can be obtained $$DL(I_1,I_2)=w_h D_h(I_1,I_2)+w_v D_v(I_1,I_2)$$

where weights $w_h$ and $w_v$ should be assigned proportionally to the number of corresponding vertical and horizontal line segments found in two images in the following manner. Denoting the maximum number of horizontal line segments in images $I_1$ and $I_2$ as Max H and the maximum number of vertical line segments in those images as Max V $$w_h=\text{Max } H/(\text{Max } H+\text{Max } V), w_v=\text{Max } V/(\text{Max } H+\text{Max } V).$$

Now a combined word-line distance between two images $I_1$, $I_2$ can be calculated $$DWL(I_1,I_2)=w_W DW(I_1,I_2)+w_L DL(I_1,I_2)$$

where $w_W$ and $w_L$ appropriately chosen weights of the two features, typically $w_W>0.7$ and $w_L<=0.3$ since there are typically a lot more words in the documents than lines.

The result of the optimal matching of line patterns will be closely matching pairs of lines in two images (if the images as is the case in the pre-sorted embodiment are of the same origin) as depicted in FIG. 4, Step 4 and those closely matched lines (both horizontal and vertical) in the prototype image, chosen as described above, will be retained to form the final prototype (training) image for the given layout (FIG. 4, Step 8). Similarly, the result of the optimal matching of words of two images (with the same origination as stipulated above) will be pairs of closely matching words. These closely matching words will be retained to form the final training image for the given layout). The same process can be repeated for another image of the same origin to achieve more reliable results if the participated images were noisy, badly scanned or of inferior quality. This process applies equally to first generation electronic images (vector images) that are not scanned but generated purely electronically without resorting to paper (such as first-generation PDF images). In this case the use of more than two images is not necessary.

All the rest of the lines and the words, as described above, constituting the variable content of the layout are either removed (FIG. 4, Step 6) or ignored as explained below. It will be apparent to those skilled in the art that there are other alternative ways to define the distances between sets of geometric line segments and distances between words (for instance dilating lines into appropriately small rectangles, corresponding to potential distortion of images in the process of scanning, and then calculating distances between thus obtained rectangles). The present invention comprises in its intention and scope all such modifications so that they would represent another embodiment for the present invention.

There are at least two ways to form the final prototype images to be used in subsequent classification: either to physically remove all variable elements as pixels or create a list of all variable elements (lines, words) to be attached to the original prototype image and simply ignore all the elements in this list in the process of classification.

If the images of documents are not pre-sorted into folders of images of the same origin then the following process applies. The first input image $I_1$ is matched according to the matching method detailed above with all other available images. This is done by calculating DWL $(I_1, I_2)$ for running image $I_2$ until a matching criterion is met, typically finding an image $I_2$ whose distance DWL $(I_1, I_2)$ to $I_1$ is sufficiently small, that is below a pre-defined threshold. If such an image $I_2$ is not found the image $I_1$ does not have any similar images and the sample of images is not sufficient to form a training image for image of $I_1$ class. If such an image $I_2$ is found the situation in this embodiment becomes that of the pre-classified/pre-sorted embodiment detailed above and the same process as in the pre-classified embodiment applies.

The classification process as described in U.S. Pat. No. 8,831,361 will proceed in the following manner. For each image I to be classified the image I is matched against all the prototype images P obtained as described above. The most essential part of this matching is that if in the image P variable features (words and lines) have been removed, image I is transformed for matching purposes into image $I_t$ containing only features sufficiently close to those of image P. Alternatively, all the features of image I sufficiently close to the permanent features of image P will participate in the classification process, all other features of image I are being ignored. In one embodiment of the present invention applicable to commercial documents such as invoices and purchase orders where variable content is placed in a specific area of the image (typically at the bottom two thirds of the image), image $I_t$ will be formed by deleting or ignoring all the features in the image I that are outside of the area occupied by the features of image P. In another embodiment of the present invention applicable to fixed forms such as Fannie Mae 1003 where variable content is a filled in content that occurs throughout the image a list L of words from the image P will be created and the image $I_t$ is formed by ignoring removing from image I all the words that are not present in list L of words from image P. If need be the words from image I and list L can be matched approximately by using a string distance as described above.

What is claimed is:

1. A system of automatic generation of training images for classification of document images using computer performing the steps of:
   automatically obtaining the salient features of the document image layout, said features consisting of words and their positions but not sizes;
   geometric line segments;
   using said features to define distances between images of document pages;
   using said distances for optimally matching the salient features in images;
   retaining in training images only optimally matched salient features, that constitute permanent features, all other salient features being variable features;
   automatically removing or excluding all variable salient features from training images.

2. A method of classification of pages of input document images into images similar to the training images, such method including the steps of
   automatically generating a set of salient features comprising geometric line segments and words and their positions but not sizes, for any input image to be classified;
   automatically selecting a training image from a collection of training images to be matched against the input image to be classified;

automatically generating a set of salient features comprising horizontal and vertical line segments and words and their positions but not sizes, for the training image;
using said features to define distances between images;
using said distances to automatically match the input image to the training image while automatically removing or ignoring all the salient features of the input image that are not close to the salient features present in the training image so that the classification uses only permanent salient features of both images.

\* \* \* \* \*